United States Patent
Hariharan et al.

(10) Patent No.: US 12,324,070 B2
(45) Date of Patent: Jun. 3, 2025

(54) H-BRIDGE BUCK-BOOST FOR ADAPTIVE DRIVING BEAM HEADLAMPS

(71) Applicant: Maxim Integrated Products, Inc., San Jose, CA (US)

(72) Inventors: Suresh Hariharan, Livermore, CA (US); Ron Vincent Ocampo, San Jose, CA (US); Ramesh Selvaraj, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 18/088,529

(22) Filed: Dec. 24, 2022

(65) Prior Publication Data
US 2023/0247741 A1    Aug. 3, 2023

Related U.S. Application Data

(60) Provisional application No. 63/304,542, filed on Jan. 28, 2022.

(51) Int. Cl.
| H05B 45/39  | (2020.01) |
| H05B 45/325 | (2020.01) |
| H05B 45/345 | (2020.01) |
| H05B 45/36  | (2020.01) |
| H05B 45/375 | (2020.01) |
| H05B 45/38  | (2020.01) |
| H05B 45/54  | (2020.01) |

(52) U.S. Cl.
CPC .......... *H05B 45/54* (2020.01); *H05B 45/325* (2020.01); *H05B 45/345* (2020.01); *H05B 45/36* (2020.01); *H05B 45/375* (2020.01); *H05B 45/38* (2020.01)

(58) Field of Classification Search
CPC ...... H05B 45/37; H05B 45/39; H05B 45/375; H05B 45/395; H05B 45/3725
See application file for complete search history.

(56) References Cited

U.S. PATENT DOCUMENTS

| 9,763,296  | B1 * | 9/2017  | Milanesi | H05B 45/46 |
| 9,819,264  | B1 * | 11/2017 | Boezen   | H02M 1/15  |
| 2007/0086224 | A1 * | 4/2007 | Phadke   | H02M 3/285 |
|            |      |         |          | 363/65     |

(Continued)

FOREIGN PATENT DOCUMENTS

| DE | 102009025752 A1 | 12/2010 |
| KR | 1020140028903 A | 10/2014 |

OTHER PUBLICATIONS

German office action mailed Sep. 28, 2023 in related German patent application No. 102023100978.8, (9 pgs).

(Continued)

*Primary Examiner* — Tung X Le
(74) *Attorney, Agent, or Firm* — Knobbe, Martens, Olson & Bear, LLP (57) ABSTRACT

Described are light emitting diode (LED) and non-LED driver systems and methods that reduce current overshoot and, deadtime, and other undesirable effects in applications such as adaptive driving beam headlamp application that negatively impact circuit parameters, including efficiency. In certain embodiments, this is accomplished by using a current clamp circuit that is controlled such as to limit an overshoot in load current, e.g., when a number of LEDs that are turned on changes.

20 Claims, 5 Drawing Sheets

(56) References Cited

U.S. PATENT DOCUMENTS

| | | | |
|---|---|---|---|
| 2008/0180075 A1* | 7/2008 | Xie | H02M 3/156 |
| | | | 323/282 |
| 2011/0121741 A1 | 5/2011 | Yamamoto et al. | |
| 2015/0042237 A1* | 2/2015 | Huber | H05B 45/375 |
| | | | 315/210 |
| 2015/0256071 A1* | 9/2015 | Penzo | H05B 45/48 |
| | | | 315/297 |
| 2018/0270923 A1* | 9/2018 | Milanesi | H05B 47/25 |
| 2021/0076465 A1* | 3/2021 | Aoki | H05B 45/14 |
| 2021/0100082 A1* | 4/2021 | Aoki | H05B 45/375 |

OTHER PUBLICATIONS

Response to German office action filed Nov. 6, 2023 in related German patent application No. 102023100978.8, (1 pg).
Decision to grant a patent application mailed Feb. 15, 2024 in the related German Patent Application No. 10 2023 100 978.8, (8 pgs).

\* cited by examiner

H-BRIDGE BUCK-BOOST FOR ADAPTIVE DRIVING BEAM HEADLAMPS

CROSS REFERENCE TO RELATED PATENT APPLICATIONS

The present application claims priority benefit, under 35 U.S.C. § 119(e), to commonly-assigned U.S. Provisional Patent Application No. 63/304,542, filed on Jan. 28, 2022, entitled "H-Bridge Buck-Boost For Adaptive Driving Beam Headlamps," and listing as inventors Suresh Hariharan, Ron Vincent Ocampo, and Ramesh Selvaraj, which application is herein incorporated by reference as to its entire content. Each reference mentioned in this patent document is incorporated by reference herein in its entirety.

BACKGROUND

A. Technical Field

The present disclosure relates generally to electrical control systems. More particularly, the present disclosure relates to systems and methods for reducing current overshoot in Light Emitting Diode (LED) applications drivers.

B. Background

Adaptive driving beam (ADB) headlamps are quickly becoming prevalent in modern vehicles. A typical ADB circuit uses an LED driver that drives a string of LEDs, which turns on a varying number of LEDs at a given time, e.g., depending on driving conditions. An ideal LED driver would accurately and rapidly regulate the output current of the LED string independent of the number of active LEDs in the string, independent of whether the output voltage of the LED string is below, above, or equal to the battery voltage, and without causing transient effects, deadtimes, or other undesirable effects that, in practice, reduce power efficiency and other quality metrics in the circuit. Although a number of designs attempt to reach this ideal circuit behavior, each existing approach has its own shortcomings.

Accordingly, it is highly desirable to have systems and methods for various applications, including as modern LED driver circuits, that overcome the deficiencies of existing designs, such as current overshoot and deadtime, without negatively impacting other circuit parameters.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not drawn to scale.

Figure ("FIG.") 1 is a simplified circuit diagram of a prior art two-stage LED driver.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

It shall be noted that embodiments described herein are discussed in the context of LED driver circuits, but one skilled in the art shall recognize that the teachings of the present disclosure are not limited to any specific driver circuit, voltage or current regulators, or LED applications and may equally be used in other contexts and to drive non-LED loads.

In this document the terms "regulator" and "converter," and the terms "LED string" and "LED array," are used interchangeably. "Control circuit" comprises microcontrollers, logic elements, amplifiers, comparators, and any other control elements recognized by one of skilled in the art.

As indicated in the Background, an ADB headlamp in a vehicle may have a varying number of LEDs turned on (e.g., biased to emit light) at any given time. As an example, the vehicle can have 16 LEDs fully turned on and, in response to a change in driving conditions that prompts the vehicle to turn off 14 of those LEDs, leave only two of the LEDs turned on. Some existing designs utilize a dual-stage architecture, such as that shown in FIG. 1, to handle this scenario.

Figure 1:
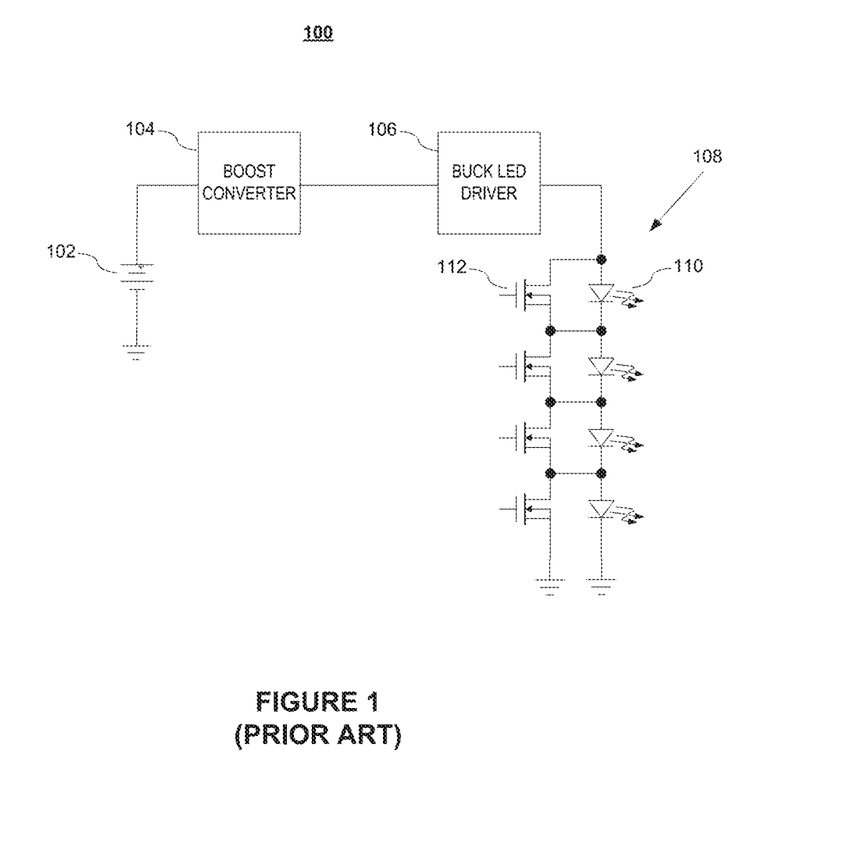

Architecture 100 in FIG. 1, which depicts a simplified circuit diagram of a prior art two-stage LED driver, comprises a battery 102 that powers a boost voltage regulator 104. Boost voltage regulator 104 is followed by buck LED driver 106 that drives LED string 108. As depicted, LED string 108 comprises a number of LEDs (e.g., 110) that each is controlled, i.e., turned on and off by a metal-oxide semiconductor field effect transistor (MOSFET) device that acts as a switch (e.g., 112). One drawback of architecture 100 is the loss of efficiency by virtue of having dual power conversion stages. Some designs address this problem by utilizing a single stage H-bridge buck boost LED driver, such as that shown in FIG. 2.

Figure 2:
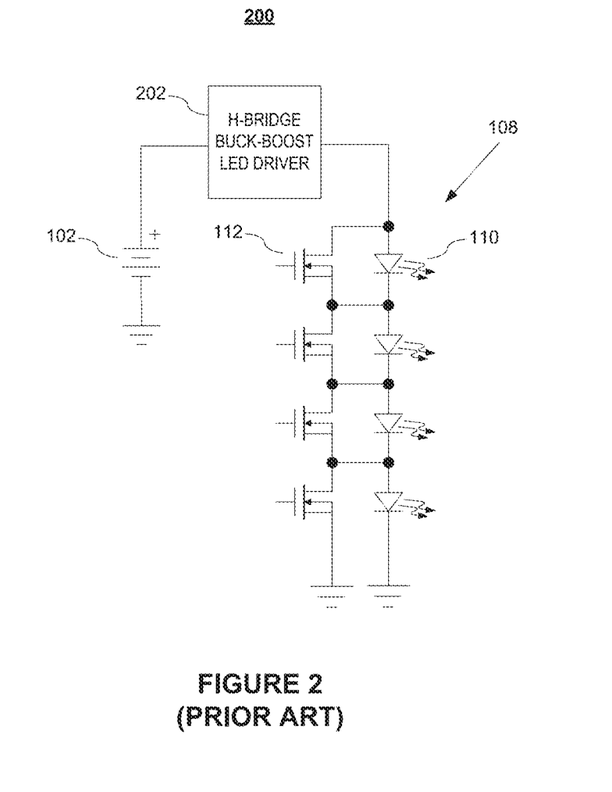
FIG. 2 is a simplified circuit diagram of a prior art single-stage LED driver utilizing an H-bridge.

FIG. 2 depicts a simplified circuit diagram of a prior art single-stage LED driver utilizing an H-bridge. Similar components as those in FIG. 1 are labelled similarly. In LED driver circuit 200, H-bridge LED driver 202, which drives LED string 108, presents its own challenges; especially, in a boost mode of operation. For example, in scenarios where the output voltage of H-bridge LED driver 202 is greater than its input voltage, i.e., the voltage at battery 102, it is required that the output capacitor (not shown in FIG. 2) has a larger capacitance value than the capacitance value that would be needed for a simple buck LED driver. However, a larger capacitor causes an increase in deadtime, e.g., when H-bridge LED driver 202 switches from driving a relatively low number of LEDs (e.g., 110) to driving a relatively higher number of LEDs. During the deadtime, there is no light output by LED string 108 since the output capacitor in LED driver circuit 200 is being charged to the new LED string voltage required to regulate to the desired current.

Conversely, when H-bridge LED driver 202 switches from driving a relatively high number of LEDs to driving a relatively low number of LEDs, the LED current experiences an overshoot condition in which the LED current exceeds a setpoint and remains in that condition for a relatively longer time, i.e., until the output capacitor discharges to the new LED string voltage. Neither scenario is desired since the additional deadtime limits the minimum dimming duty cycle of LED string 108, and a prolonged current overshoot may physically damage some or all LEDs in LED string 108. Accordingly, is desirable to have LED driver systems and corresponding methods that reduce current overshoot and deadtime in ADB and other applications.

Figure 3:
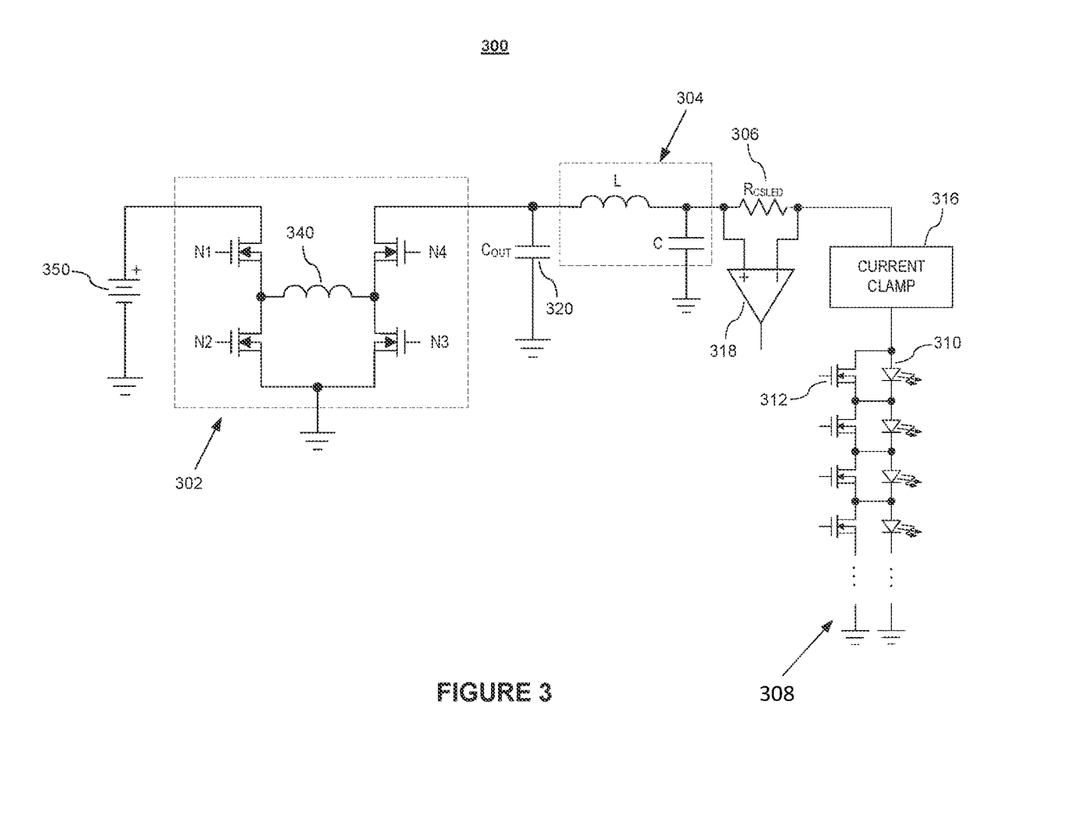
FIG. 3 is a simplified circuit diagram illustrating an exemplary system implementation for an LED driver utilizing an H-bridge, according to various embodiments of the present disclosure.

FIG. 3 is a simplified circuit diagram illustrating an exemplary system implementation for an LED driver utilizing an H-bridge, according to various embodiments of the present disclosure. In embodiments, LED driver circuit 300 may comprise H-bridge buck-boost circuit 302 that is energized by power source 350, depicted in FIG. 3 as a battery, and drives LED string 308 that comprises field effect transistors (FETs) (e.g., 312) and LEDs (e.g., 310). As depicted, H-bridge buck-boost circuit 302 comprises output capacitor 320 that is coupled to a ground potential.

In embodiments, LED driver circuit 300 may further comprise LC filter 304 that is coupled to output capacitor 320, current sense amplifier 318 that is coupled to LC filter 304 and uses current sense resistor 306, and current clamp circuit 316 that may comprise a MOS device, e.g., a high-side MOSFET coupled in a series circuit configuration with LED current string 308. One skilled in the art will appreciate that capacitors may be implemented as banks of parallel variable capacitors that may be adjusted, for example, by control logic to a predetermined capacitance value. One of skill in the art will further appreciate that FETs (e.g., 312) may be implemented by any type of switch known in the art.

In operation, the NMOS FET may control LED current string 308, e.g., in ADB headlamp applications. In embodiments, LC filter 304, which may be implemented as a second-stage LC filter, advantageously, allows output capacitor 320 to have a relatively smaller capacitance value than what a conventional H-bridge would require to maintain an LED current ripple at or below an acceptable level. In embodiments, the NMOS FET acts as a current clamp that limits an LED current transient, which may occur in response to LED string 308 varying the number of LEDs 310 that are active, e.g., when increasing or decreasing the number of LEDs 310 that are tuned on in LED driver circuit 300.

In embodiments, the NMOS FET may be "fully on" in its low $R_{DS\_ON}$ state, e.g., in a normal operation mode. Current sense amplifier 318 may detect an LED current overshoot, e.g., using direct or indirect means, and the NMOS FET may be driven in its constant current region, e.g., to regulate the overshoot current through the active LEDs 310 in LED string 308.

In embodiments, the NMOS FET may further act as a dimming FET that may provide a control point to apply Pulse-Width-Modulation (PWM) dimming to LED string 308, e.g., by using a PWM dimming signal. It is noted that without a series NMOS FET, the PWM dimming signal would need to simultaneously drive all the shunt switches (e.g., shunting FETs 312) across each individual LED (e.g., 310) to achieve the same or a similar effect. Accordingly, utilizing an NMOS dimming FET in various embodiments simplifies the control to achieve certain lighting configurations.

In some scenarios, all LEDs in LED string 308 may be turned off, i.e., all shunting switches are closed, and all LEDs are shorted. In such circumstances, using an NMOS device has distinct advantages over p-channel metal-oxide semiconductor (PMOS) devices. To illustrate this, once LED string 308 is completely shorted, a PMOS device cannot stay fully turned on since a PMOS driver will need to maintain sufficient headroom (e.g., above a ground potential) to drive the gate of the PMOS device(s). This is because, as the output voltage and, hence, the source of the PMOS device moves closer to ground, the gate cannot be driven below ground potential to maintain the necessary overdrive voltage. As a result the PMOS device will operate in its constant current region in which the drain-to-source voltage will be dictated by the target LED current and the minimum gate voltage that the driver can achieve. Disadvantageously, the power dissipation in the PMOS device would be substantially higher when all the LEDs are tuned off when compared to all LEDs conducting and the PMOS being in it its low $R_{DS\_ON}$ state.

In comparison, in embodiments herein, the gate voltage for an NMOS device may remain positive even as the voltage at the drain and source terminals of the NMOS device approach ground potential. In embodiments, a high-side NMOS driver has substantially no limitations in overdriving the gate; therefore, the NMOS device may conduct in a low $R_{DS\_ON}$ state despite that fact that all LEDs in LED string 308 may be shorted.

It is understood that the H-bridge buck-boost converter topology, including its control circuit illustrated in FIG. 3 are not limited to the constructional detail shown there or described in the accompanying text. As those skilled in the art will appreciate, any suitable control circuit may be used to accomplish the objectives of the present disclosure. Similarly, those skilled in the art will recognize that a number of the elements described above may be physically and/or functionally separated into sub-modules or combined in various configurations. LED driver circuit 300 may comprise additional or different components, such as comparators, clock-based logic circuitry, gate drivers, and the like to accomplish the objectives of the present disclosure.

It is further understood that while the features of system 300 are especially useful in the context of ADB headlight applications, one skilled in the art will recognize that the teachings of the present disclosure are not so limited and may equally be used in non-LED applications.

Figure 4:
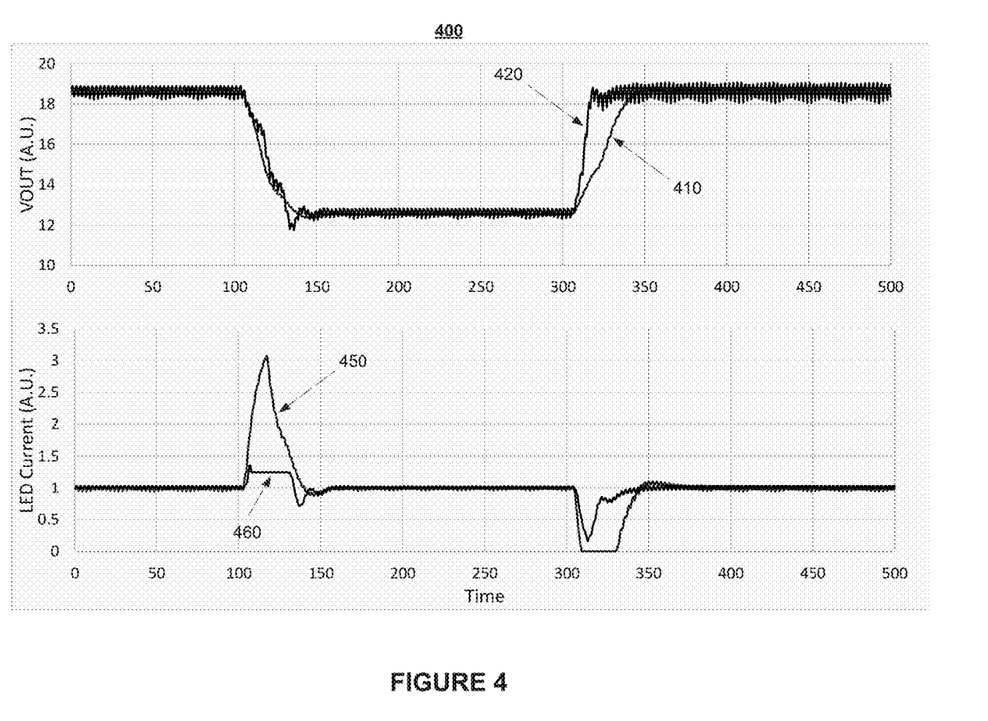
FIG. 4 shows exemplary simulation results that illustrate the effect of utilizing an LC filter and current clamp in an LED driver circuit, according to various embodiments of the present disclosure.

FIG. 4 shows exemplary simulation results that illustrate the effect of utilizing an LC filter and current claim in an LED driver circuit, according to various embodiments of the present disclosure. Waveform 410 represents the voltage at a prior art output capacitor over time (in arbitrary units). The output capacitor is implemented in an LED driver that uses a conventional H-bridge buck-boost converter, such as that discussed with reference to FIG. 2.

As depicted in FIG. 4, at about (arbitrary) time 100, the LED driver switches from, e.g., driving six LEDs to driving only four LEDs in an LED string that serves as a load to an LED driver circuit. Then, at about (arbitrary) time 300, the LED driver switches back to driving six LEDs. Waveform 450 represents a corresponding LED current (also in arbitrary units) that at time 100 experiences an overshoot condition as shown in FIG. 4.

Conversely, waveform 420 represents a voltage that may be present at an output capacitor implemented in an LED driver utilizing an H-bridge according to embodiments of the present invention. As previously mentioned, this capacitor may have a relatively smaller capacitance than that in the conventional H-bridge buck-boost converter. Nevertheless, as shown in FIG. 4, the voltage ripple remains relatively small. Similarly, the LED current ripple in waveform 460, which represents a corresponding LED current, remains at an acceptably low level. In addition, due to the operation of the current clamp that advantageously limits LED overshoot and undershoot currents, the current overshoot in waveform 460 are substantially smaller those for waveform 450. Further, due to the smaller capacitance of the output capacitor, the deadtime is also lower and the undershoot is reduced.

It is noted that these experimental data and results are provided by way of illustration and were performed under specific conditions using a specific embodiment or embodiments; accordingly, neither these experiments nor their results shall be used to limit the scope of the disclosure of the current patent document.

Figure 5:
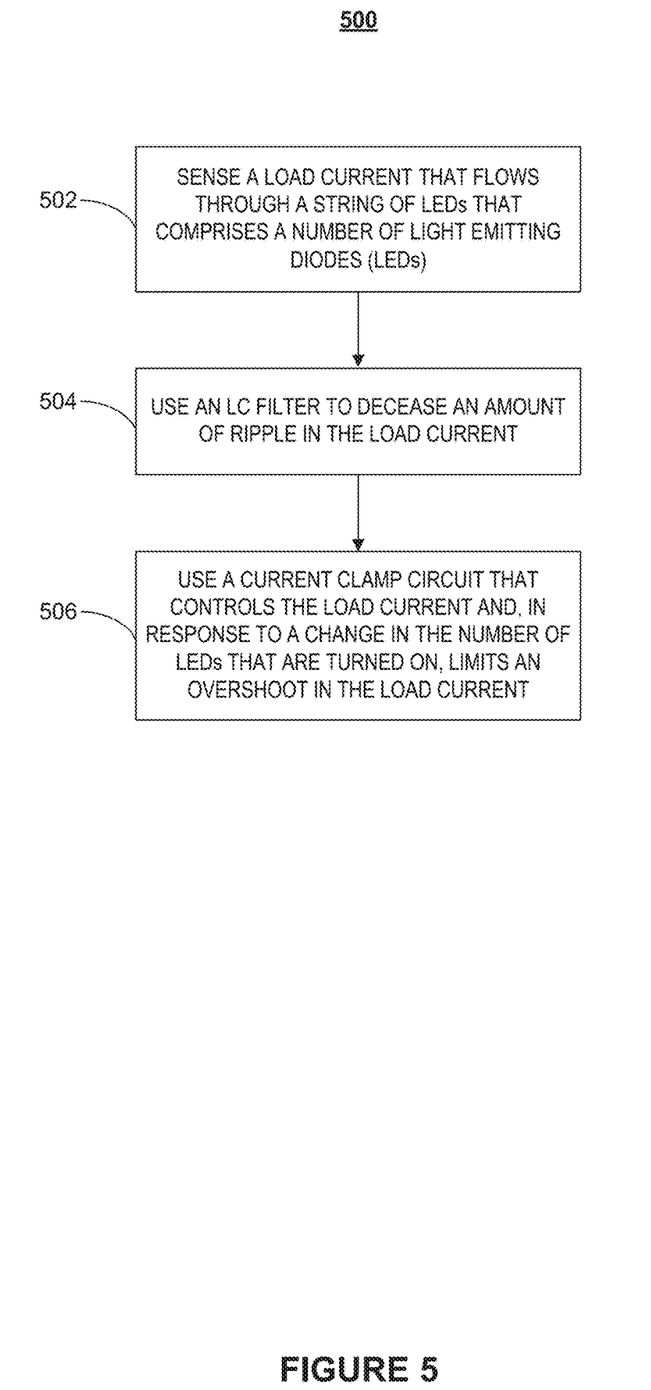
FIG. 5 is a flowchart of an illustrative process for limiting overshoot in an LED load current, according to various embodiments of the present disclosure.

FIG. 5 is a flowchart of an illustrative process for limiting overshoot in an LED load current, according to various embodiments of the present disclosure. It is noted that any experiments and results provided herein are provided by way of illustration and were performed under specific conditions using a specific embodiment or embodiments; accordingly, neither these experiments nor their results shall be used to limit the scope of the disclosure of the current patent document.

In embodiments, process 500 for limiting overshoot may begin, at step 502, when a load current that flows through a string of LEDs that comprises a number of LEDs is sensed. At step 504, an LC filter may be used to decease an amount of ripple in the load current. As previously mentioned, the LC filter may allow to reduce the capacitance value of an output capacitor in a circuit when compared to a conventional H-bridge. Finally, at step 506, a current clamp circuit that controls the load current may be used. In response to a change in the number of LEDs, the clamp circuit limits an overshoot in the load current. One skilled in the art shall recognize that: (1) certain steps may optionally be performed; (2) steps may not be limited to the specific order set forth herein; (3) certain steps may be performed in different orders; and (4) certain steps may be done concurrently.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device.

Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A light emitting diode (LED) driver circuit comprising:
a buck-boost circuit that comprises an output capacitor;
an LC filter coupled to the output capacitor, the LC filter decreases an amount of current ripple in a load current that flows through a string of LEDs that comprises a number of LEDs;
a sensing circuit that detects the load current; and
a current clamp circuit coupled to the sensing circuit, the current clamp circuit controls the load current and, in response to a change in the number of LEDs that are turned on, limits an overshoot in the load current.

2. The LED driver circuit of claim 1, further comprising a feedback loop that couples the current clamp circuit to the sensing circuit.

3. The LED driver circuit of claim 1, wherein the current clamp circuit comprises an n-channel metal-oxide semiconductor (NMOS) device that is driven in a constant current region.

4. The LED driver circuit of claim 3, wherein the NMOS device acts as a dimming field effect transistor (FET) that uses pulse-width-modulation (PWM) dimming to control the load current.

5. The LED driver circuit of claim 3, wherein the NMOS device, in a regular mode of operation, is fully turned on in a low $R_{DS\_ON}$ state.

6. The LED driver circuit of claim 1, further comprising a DC power source that is coupled to the buck-boost circuit.

7. A method for limiting overshoot in an LED load current, the method comprising:
sensing a load current that flows through a string of LEDs that comprises a number of LEDs;
using an LC filter to decrease an amount of ripple in the load current; and
using a current clamp circuit that controls the load current and, in response to a change in the number of LEDs that are turned on, limits an overshoot in the load current.

8. The method according to claim 7, wherein the current clamp circuit uses pulse-width-modulation (PWM) dimming to control the load current.

9. The method according to claim 7, further comprising using a feedback loop to couple the current clamp circuit to the sensing circuit.

10. The method according to claim 7, further comprising using a battery as a DC power source that generate the load current.

11. The method according to claim 7, further comprising driving an n-channel metal-oxide semiconductor (NMOS) device within the current clamp circuit in a constant current region.

12. The method according to claim 11, wherein the NMOS device acts as a dimming field effect transistor (FET) that uses PWM dimming to control the load current.

13. The method according to claim 11, wherein the NMOS device, in a regular mode of operation, is fully turned on in a low $R_{DS\_ON}$ state.

14. A light emitting diode (LED) driver circuit comprising:
an H-Bridge buck-boost circuit that comprises an output capacitor;
an LC filter coupled to the output capacitor, the LC filter decreases an amount of current ripple in a load current that flows through a string of LEDs that comprises a number of LEDs;
a sensing circuit that detects the load current; and
a current clamp circuit coupled to the sensing circuit, the current clamp circuit controls the load current and, in response to a change in the number of LEDs that are turned on, limits an overshoot in the load current.

15. The LED driver circuit of claim 14, further comprising a feedback loop that couples the current clamp circuit to the sensing circuit.

16. The LED driver circuit of claim 14, further comprising a DC power source that is coupled to the buck-boost circuit.

17. The LED driver circuit of claim 14, wherein the current clamp circuit comprises an n-channel metal-oxide semiconductor (NMOS) device that is driven in a constant current region to linearly regulate an overshoot in the load current.

18. The LED driver circuit of claim 17, wherein the NMOS device acts as a dimming field effect transistor (FET) that uses pulse-width-modulation (PWM) dimming to control the load current.

19. The LED driver circuit of claim 17, wherein the NMOS device, in a regular mode of operation, is fully turned on in a low $R_{DS\_ON}$ state.

20. The LED driver circuit of claim 17, wherein the sensing circuit is coupled between the LC circuit and the current clamp circuit.

* * * * *